Jan. 5, 1943.   J. E. WAINWRIGHT   2,307,175
YIELDABLE MEANS
Filed July 17, 1939
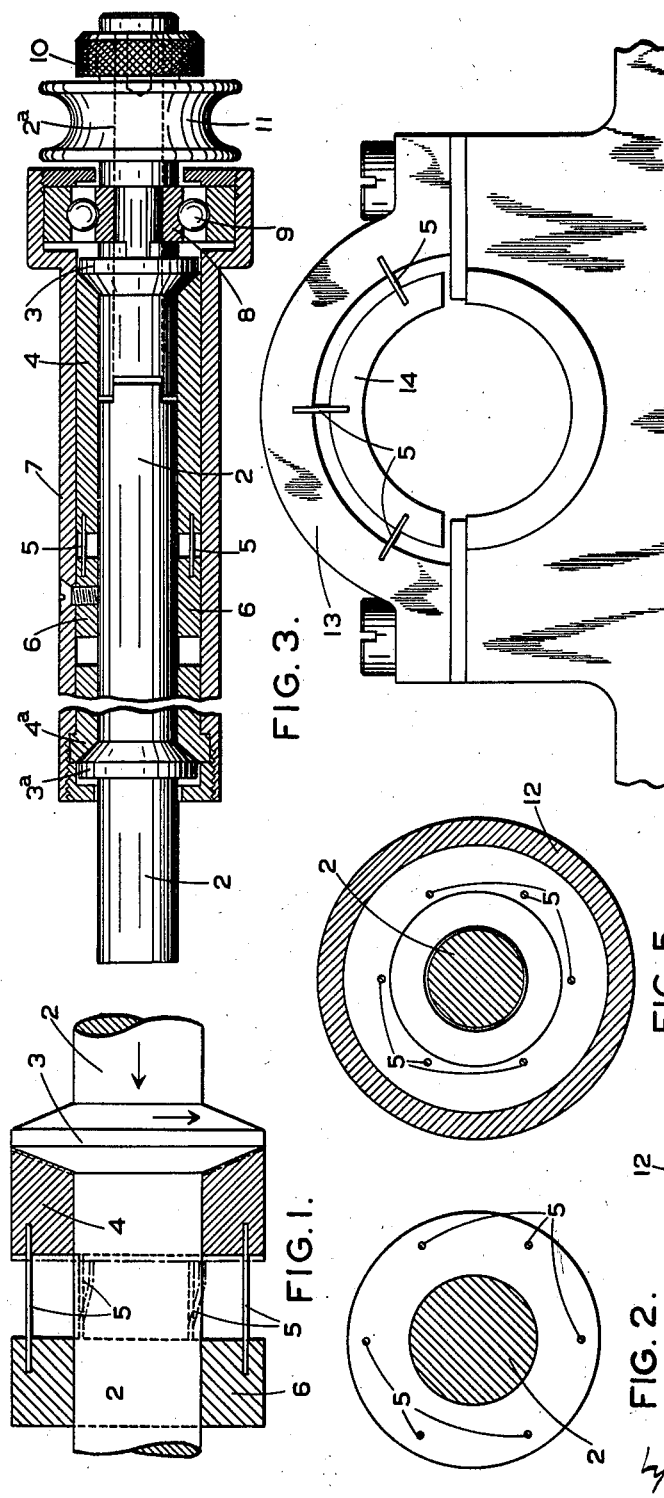

Patented Jan. 5, 1943

2,307,175

UNITED STATES PATENT OFFICE 2,307,175

YIELDABLE MEANS

John Ernest Wainwright, Coventry, England

Application July 17, 1939, Serial No. 285,025
In Great Britain July 23, 1938

9 Claims. (Cl. 308—135)

The object of the present invention is to provide an improved method of and means for preventing excessive pressure between the contacting surfaces of relatively movable elements subject to a varying load.

Amongst a wide variety of other applications the invention may be advantageously employed in connection with axial or lateral thrust bearings, friction clutches, vehicle shock-absorbers, slip and shear drives and in all cases where it is desired to prevent excessive axial or lateral pressure between co-acting elements when the transmitted torque exceeds a pre-determined value.

According to the improved method one or each of said elements is mounted in such a manner that immediately the pressure between them exceeds a pre-determined value the resulting tendency for the elements to move together operates to produce relative movement between them in a direction to prevent any further substantial increase in their frictional contact with one another.

For this purpose one or each of said elements is constructed, arranged and adapted to function so that it offers a normally unyielding resistance to axially or laterally applied stresses but will yield resiliently in a direction to prevent substantial additional frictional contact when the said stresses exceed a pre-determined maximum.

In the accompanying drawing,

Figures 1 and 2 are detail longitudinal and cross-sectional views illustrating the principle of the invention as applied to an axial thrust bearing.

Figure 3 is a longitudinal sectional view of a spindle showing one specific application of the invention.

Figure 4 is a similar view illustrating another specific application of the invention.

Figure 5 is a cross-sectional view of Figure 4 taken through the wires.

Figure 6 shows the application of the invention to a bearing cap.

The underlying principle of the invention will be clearly understood by a reference to Figures 1 and 2. The shaft 2 is adapted to be rotated under a varying axial load and is provided with a thrust collar 3. One face of this collar bears against a thrust receiving member 4 which is loosely mounted on the shaft and connected by means of an annular series of axially arranged wires or strips 5 of spring steel with a member 6 which is fixed relatively to the shaft. With this arrangement it is found that if the thrust-receiving member 4 is only subject to an axial thrust in the direction of the arrow the wires offer a rigid resistance. If, however, the shaft is rotating and the axial thrust exceeds a pre-determined value there will be a tendency for the thrust receiving member 4 to rotate with the shaft owing to the increased frictional contact between the contacting faces of the member 4 and collar 3. When the torque transmitted to the member 4 exceeds the resistance to deflection offered by the wires the latter will be deformed out of parallelism with the axis of rotation, or to a different angle thereto, as the case may be. The effect in either case will be to shorten the axial distance between the relatively fixed member 6 and the thrust-receiving member 4 and to thereby prevent any substantial increase in friction between the contacting faces of the member 4 and thrust collar 3. Since the member 4 is rigid under axial pressure only, the initial pre-determined pressure between it and the collar 3 can be adjusted within wide limits. The torsional resistance offered by the member 4 can be increased as desired by reducing the length and/or increasing the cross-sectional area of the wires 5 or by increasing the number of them.

One specific application of the invention to the spindle 2 of a grinding wheel is shown in Figure 3 in which 4 represents the thrust receiving member, 5 the series of spring-wires, and 6 the fixed member which is anchored to the outer casing 7. For the purposes of adjustment the thrust collar 3 is slidably mounted on the reduced end of the spindle 2 and has a driven engagement therewith and with the inner race 8 of the bearing 9. The reduced free end 2ª of the spindle is screw-threaded to receive a nut 10 which takes a bearing against the pulley 11 keyed to the spindle. The initial or normal pressure at the thrust faces is adjusted by rotating the nut the effect of which is to draw the spindle towards the right hand to keep the collar 3ª thereon up against the fixed thrust receiving member 4ª and to force the thrust collar 3 towards the member 4. When during the running of the spindle the axial load thereon is such as to increase the pressure between the thrust faces to such an extent that there is a tendency for the member 4 to rotate, the resulting deflection and shortening of the wires 5 operates to withdraw the member 4 away from the thrust collar 3 thereby preventing any substantial further increase in friction between the thrust faces and preventing any risk of seizure.

Figures 4 and 5 show another specific application of the invention as applied to a spindle 2 subject to end thrust. In this case the device for relieving axial pressure between the thrust faces is associated with a fixed thrust cap 12, and comprises as before, a thrust receiving member 4 which is carried by an annular series of short wires 5 attached to the thrust cap. The effect produced is the same as above described with reference to Figure 3, i. e. when the pressure between the member 4 and collar 3 exceeds a pre-determined maximum and the former tends to rotate with the latter the resulting deflection and shortening of the wires 5 operate to draw the member 4 away from the collar 3 thus automatically yielding to the pressure. Immediately the axial pressure again falls below the predetermined value the resiliency of the wires restores the thrust receiving member to its normal position with respect to the collar 3.

The invention is also applicable, as shown in Figure 6 to the cap 13 of a split bearing. One half 14 of the bearing is connected with the cap by means of a plurality of radially arranged strips 5 of spring steel. In this case any tendency for the bearing member 14 to rotate with the shaft is resiliently resisted by the spring strips the resulting deflection of which operates to move the said bearing member in a direction to reduce the frictional contact between it and the said shaft.

It is preferred to use wires or strips of as short a length as possible so that if vibration is set up their frequency will be so high as not to synchronise with those of other parts of the machine or mechanism.

I claim:

1. Means for use in association with a rotating part, said means comprising a normally non-rotating element definitely pressed against said part with a predetermined pressure and making a smooth face contact therewith, an operatively fixed member, and a plurality of resilient means respectively having end portions respectively positively connected to said element and member respectively, said means normally forcing said element against said part with a predetermined normal pressure and yielding or flexing to permit said element to make a partial rotary movement under the frictional drag or torque thrust of said part when the pressure between said part and element for any reason increases beyond a certain point, the resultant deformation and bending or deflection of said means pulling upon said element and compelling it to move toward said member and in a direction away from said part to prevent damage or stoppage of operation by continuance or increase of the excessive pressure of engagement between said part and element.

2. Means for use in association with a rotary part, said means comprising a normally non-rotating element normally disposed and held concentric with the axis of said part and making a smooth face contact therewith, an operatively fixed member, and a plurality of stiffly resilient means respectively having portions respectively positively connected to said element and said member respectively, said resilient means normally forcing said element against said part with a predetermined normal pressure and yielding or flexing to permit said element to make a partial rotary movement under the drag or torque thrust of said part when the pressure between said part and element for any reason increases beyond a certain point, the resultant deformation and bending or deflection of said means pulling upon said element and compelling it to move toward said member and in a direction away from said part.

3. Means for use in association with a rotating part, said means comprising a normally non-rotating element normally disposed and held in definite relation to the axis of said part, an operatively fixed member, and a plurality of stiffly-resilient bar-form means respectively having end portions respectively positively connected to said element and member respectively, said resilient means normally forcing said element against said part with a predetermined normal pressure and yielding or flexing to permit said element to make a partial rotary movement under the frictional drag or torque thrust of said part when the pressure between said part and element for any reason increases beyond a certain point, the resultant deformation and bending or deflection of said resilient means pulling upon said element and compelling it to move toward said member and in a direction away from said part.

4. Means for use in association with a rotating part, said means comprising a normally non-rotating element, an operatively fixed member, and a plurality of leaf-spring type resilient means respectively having portions respectively positively connected to said element and member respectively, said resilient means normally forcing said element against said part with a predetermined normal pressure and yielding or flexing to permit said element to make a partial rotary movement under the frictional drag or torque thrust of said part when the pressure between said part and element for any reason increases beyond a certain point, the resultant deformation and bending or deflection of said resilient means pulling upon said element and compelling it to move toward said member and in a direction away from said part, the portions of said resilient means respectively extending between the opposed faces of said element and member respectively being as short as possible and still permit a relative partial turn by said element without damage to said means and of sufficient extent to compel said element to move definitely and appreciably in the direction of said member, whereby in case vibration is set up in said rotating part and any mechanism associated therewith the frequency of vibration of said resilient means will be so high as not to synchronize with those of said part or mechanism.

5. Means for use in association with a rotating part, said means comprising a normally non-rotating element, an operatively fixed member, and a plurality of yieldable means respectively having portions respectively positively connected to said element and member respectively, said yieldable means normally forcing said element against said part with a predetermined normal pressure and yielding to permit said element to make a rotary movement under the frictional drag or torque thrust of said part when the pressure between said part and element for any reason increases beyond a certain point, the resultant deformation of said yieldable means pulling upon said element and compelling it to move toward said member and in a direction away from said part.

6. Means for use in association with a rotating part, said means comprising a normally non-rotating element normally disposed and held concentric with the axis of said part and definitely pressed axially of said part against a radial face thereof and making a smooth face contact therewith, an operatively fixed part to be disposed co-axial with said part, and an annular series of resilient leaf-spring type means respectively having end portions respectively positively connected to said element and member respectively, said resilient means normally forcing said element against said part with a predetermined normal pressure and yielding or flexing to permit said element to make a partial rotary movement under the frictional drag or torque thrust of said part when the pressure between said part and element for any reason increases beyond a certain point, the resultant deformation and bending or deflection of said resilient means pulling upon said element and compelling it to move toward said member and in a direction away from said part.

7. Means for use in association with a rotating part, said means comprising a normally non-rotating element normally disposed and held in definite relation to the axis of said part, an operatively fixed member, and a plurality of leaf springs in the assembled association with said rotating part extending radially of said part and respectively having end portions respectively positively connected to said element and said member respectively, said springs normally forcing said element against said part with a predetermined normal pressure and yielding or flexing to permit said element to make a partial rotary movement under the frictional drag of torque thrust of said part when the pressure between said part and element for any reason increases beyond a certain point, the resultant deformation and bending or deflection of said springs pulling upon said element and compelling it to move toward said member and in a direction away from said part.

8. A rotary spindle or shaft composite bearing assemblage for a spindle or shaft having a radial face, said bearing assemblage comprising a bearing sleeve, radial and end thrust bearing means held in fixed position in said sleeve and engaging said shaft, an end-thrust bearing element having a radial face, a fixed member, and a plurality of leaf-springs having their respective end portions anchored in said element and member respectively to normally force the radial face of said element against the radial face of said shaft with a predetermined pressure and yielding or flexing to permit said element to make a partial rotary movement under the frictional drag or torque thrust of said shaft when the pressure between said shaft and element for any reason increases beyond a predetermined point, the resultant deformation and bending or deflection of said springs pulling upon said element and compelling it to move toward said member and in a direction away from said radial face of said shaft.

9. A rotary spindle or shaft composite bearing assemblage for a spindle or shaft having a conical face concentric with its axis, said bearing assemblage comprising a bearing sleeve, radial and end thrust bearing means held in fixed position in said sleeve and on said shaft, an end-thrust bearing element having a conically recessed face, a fixed member co-axial with said shaft, an annular series of leaf springs having their respective end portions anchored in said element and member respectively to hold said element concentric with the axis of said shaft and to normally force the face of the conical recess of said element against the conical face of said shaft with a predetermined pressure and yielding or flexing to permit said element to make a partial rotary movement under the frictional drag or torque thrust of said shaft when the pressure between said shaft and element for any reason increases beyond a predetermined point, the resultant deformation and bending or deflection of said springs pulling upon said element and compelling it to move toward said member and in a direction away from said conical face of said shaft.

JOHN ERNEST WAINWRIGHT.